Dec. 11, 1934.    R. MENSING    1,984,029
CLEANSING APPARATUS FOR WASTE WATER AND A METHOD OF OPERATING THE SAME
Filed Sept. 20, 1932    3 Sheets-Sheet 1
Fig.1
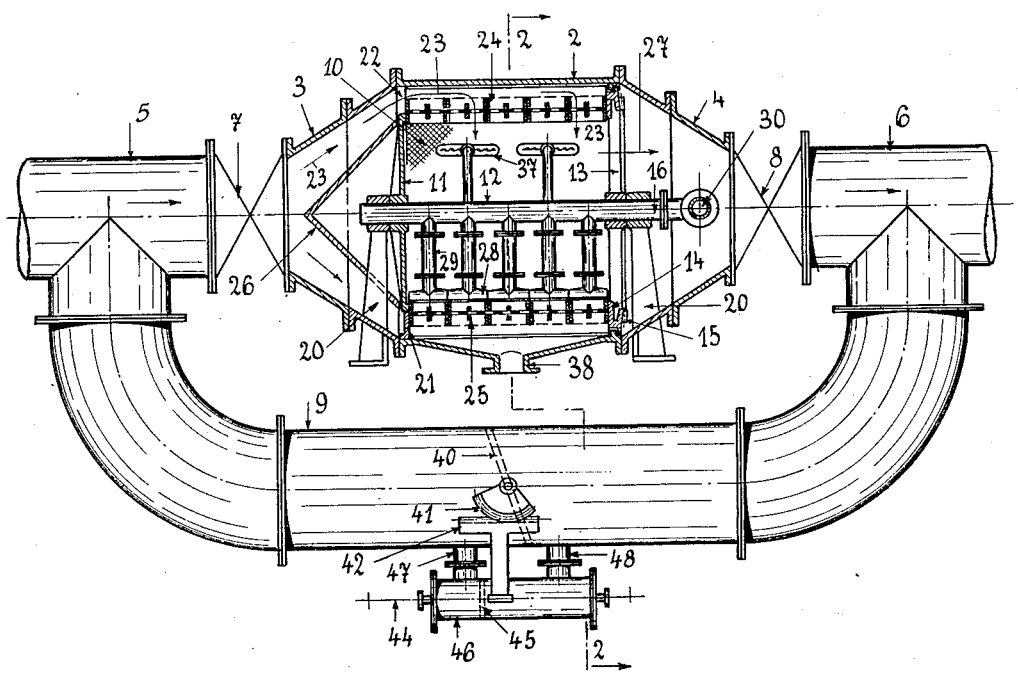
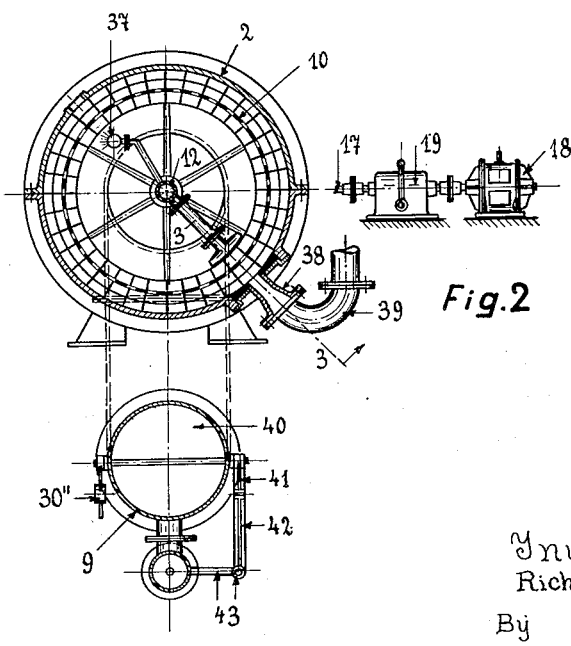
Fig.2
Inventor
Richard Mensing
By *Dr Berg*
Attorney Dec. 11, 1934.   R. MENSING   1,984,029
CLEANSING APPARATUS FOR WASTE WATER AND A METHOD OF OPERATING THE SAME
Filed Sept. 20, 1932   3 Sheets-Sheet 2

Inventor
Richard Mensing
By Dr Berg
Attorney

Dec. 11, 1934. R. MENSING 1,984,029
CLEANSING APPARATUS FOR WASTE WATER AND A METHOD OF OPERATING THE SAME
Filed Sept. 20, 1932 3 Sheets-Sheet 3

Inventor
Richard Mensing
By D. Berg
Attorney

Patented Dec. 11, 1934

1,984,029

UNITED STATES PATENT OFFICE 1,984,029

CLEANSING APPARATUS FOR WASTE WATER AND A METHOD OF OPERATING THE SAME

Richard Mensing, Neustadt/Haardt, Germany

Application September 20, 1932, Serial No. 633,999
In Germany January 8, 1931

7 Claims. (Cl. 210—199)

This invention relates to improvements in liquid and more particularly water purifying or filtering plant of the type employing a movable sieve or filtering member. This filtering member may be in the form of a wire sieve or of suitably perforated plates or porous members. It has hitherto been necessary to provide large and cumbersome structures to cover in the open channel forms in which only part of the entire surface of the movable sieve was in effective operation at any given time. In these known forms it was also a very considerable source of difficulty to secure water tight joints at the ends of the sieve drum, which may be circular or of the travelling type. Such water-tightness is of course necessary in order to prevent the untreated water from gaining access to the treated liquid stream and thus undoing the work of the plant.

One object of this invention is to enable the use of substantially the entire surface area of the moving sieve for effective operation at any given time. Another object is to enable the sieve to be cleansed effectively whilst in operation and in spite of the fact that nearly the whole surface of the sieve is in effective operation. A further object is to prevent damage to the plant by over pressures caused when the sieves become clogged with sludge or the like.

By means of this invention the water purifying plant is more compact, as the entire surface area of the sieve is for all practical purposes in effective operation at all times. The cleansing operation, which was hitherto generally performed on the unused part of the sieve at any given time, is according to this invention continuously performed as the sieve moves past a chosen point, where suitable cleansing streams are projected through the sieve and these cleansing streams are isolated from the current of liquid under treatment and which is admitted to all points around the enclosed side of the sieve.

It is an essential of this invention that one side of the sieve is enclosed by the surrounding casing and that there are suitable means for supplying liquid to be treated to the whole area of this enclosed side. The liquid to be treated may be fed to the interior of the drum, which may be referred to as the "inner feed" type or to the exterior of the drum, in which case the plant may be referred to as of the "outer feed type". The present invention is applicable to both types and is herein illustrated as applied to these two main classes of plant. These accompanying drawings are somewhat diagrammatic in character and only show examples to illustrate the nature of this invention, the detailed structure and even the general arrangement of which may be varied within wide limits without departing from the novel features as pointed out in the appended claims.

In these drawings:

Figure 1 is an elevation partly in section in the plane containing the axis of the sieve drum and shows a plant of the "outer feed type".

Figure 2 is a section in a plane at right angles to that of Figure 1.

Figure 8:
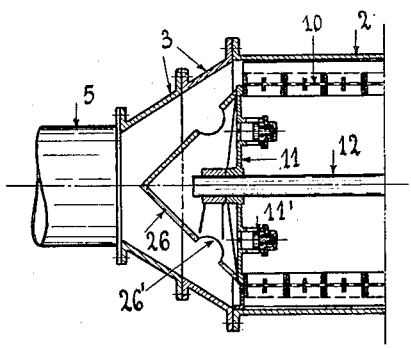
Figures 8 and 9 are respectively longitudinal and cross sections showing part of the sieve drum and surrounding casing with a modified form of pressure relief device from that shown in Figures 1 and 2.

According to the form shown in Figures 1 and 2, the enclosing casing 2 is of substantially cylindrical form and is connected by means of conical covers 3, 4 to the supply pipe 5 for untreated water or the like and to the discharge pipe 6 for the treated liquid which has passed through the filtering members. Valves indicated at 7 and 8 are located just at the front and in the rear of the apparatus considered in the direction of flow of the stream of liquid under treatment. A bye-pass pipe 9 is arranged for the double purpose of enabling the apparatus to be shut off and the liquid passed to another plant when a battery of these devices are employed and also for the purpose of relieving the sieve or filtering member from strain when an over pressure occurs. The sieve drum is composed of the cylindrical filtering member 10 closed at one end by a solid end plate or disc 11 and open at its other end which is formed by a spider construction 13, that is to say by a member composed of arms radiating from a hub mounted to rotate freely on a hollow central tube or shaft 12. The spider structure 13 is provided with a rim 14 which runs in a suitable packing groove in the fixed casing 2 and also is provided with a crown of bevel gear teeth indicated at 15. A bevel pinion 16 engages in the teeth of the crown to rotate the drum about the hollow axis 12. The bevel pinion 16 is mounted on a shaft 17 which passes through a stuffing box formed in the conical end 4 of the fixed enclosing casing 2 and is driven by a motor 18 through change speed gear indicated at 19.

The central hollow tube or shaft 12 does not rotate and is supported in brackets 20 formed on arms cast on to the interior of the distributing cone 26 hereinafter described and the conical cover 4. The end plate 11 is preferably circular in shape and runs as a working fit in a ring 21 fixed inside the casing 2 and having apertures 22 spaced around its periphery to distribute the impure liquid over the entire circumference of the sieve. A cone 26 conveniently having its base substantially the diameter of the sieve directs the impure liquid stream towards the annular space left between the sieve 10 and the interior of the casing 2. It will be seen from the above that one side of the sieve 10 is completely encased or enclosed by virtue of the end plate 11 and the ring 14 which as described above runs in packing grooves in the casing 2. To this completely enclosed side of the sieve the water is admitted over the entire or practically the entire surface area of the sieve. In other words the sieve is completely immersed in the water which is pumped into the supply pipe 5 under moderate pressure sufficient to cause it to rise to the top of the casing 2. This water is forced to pass through the sieve in order to get to the outlet or discharge pipe 6.

If an over pressure occurs, say through blockage of the sieve 10, a valve 40 is opened by the mechanism now about to be described. The valve 40 is shown as of the butterfly type and its spindle carries a toothed segment 41 engaging in a toothed rack 42, which is articulated by rods indicated at 43 and 44 to a piston 45 in a cylinder 46. The cylinder 46 is connected by a pipe 47 leading from one side of the butterfly valve 40 to one side of the piston 45 and by a pipe 48 leading from the other side of the butterfly valve to the other side of the piston 45. In this way if an over pressure should occur on the supply side of the plant, the piston 45 is moved from left to right in Figure 1 and the butterfly valve 40 is opened. Damage to the sieve is thereby avoided. A small balance weight 50 may be provided to effect the return of the valve 40 when the over pressure is balanced out.

Figure 9:
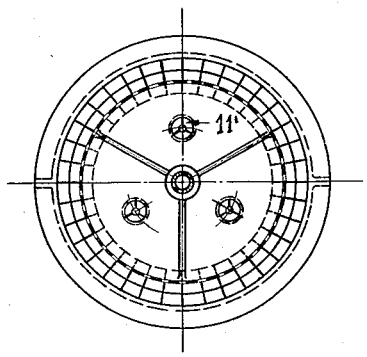

In some cases the relieving mechanism for compensating for over pressures may be modified to the form shown in Figures 8 and 9, where the valves 11' are arranged in the solid end plate of the sieve drum and are suitably loaded by their springs so that the safe pressure difference permissible between the supply and the discharge is not exceeded. Openings 26' in the distributing cone 26 allow the full supply pressure to act on one side of the relief valve 11'. In this case there is no need for a bye-pass pipe 9, unless the plant or apparatus is one in a battery and it is sometime desired to shut down a filter for repair or special cleaning.

A very important feature of this invention resides in the fact that I can provide a totally immersed movable sieve drum with a cleansing jet system, the cleansing jet being isolated from the stream of liquid under treatment. This result is obtained by dividing the cylindrical surface of the sieve into a large number of strips by radiating plates, which move with the sieve and at the point in the travel of the sieve where the sections come opposite the cleansing stream jets, I provide packing means which co-operate with the radiating plates to isolate the sections between adjacent plates opposite the cleansing jets from the stream of liquid under treatment and at the same time establish communication with a discharge for cleansing water and sludge or the like removed from the sieve. It will of course be understood that the cleansing jets are directed in a reverse direction to that in which the treated liquid flows through the sieve.

Figure 3:
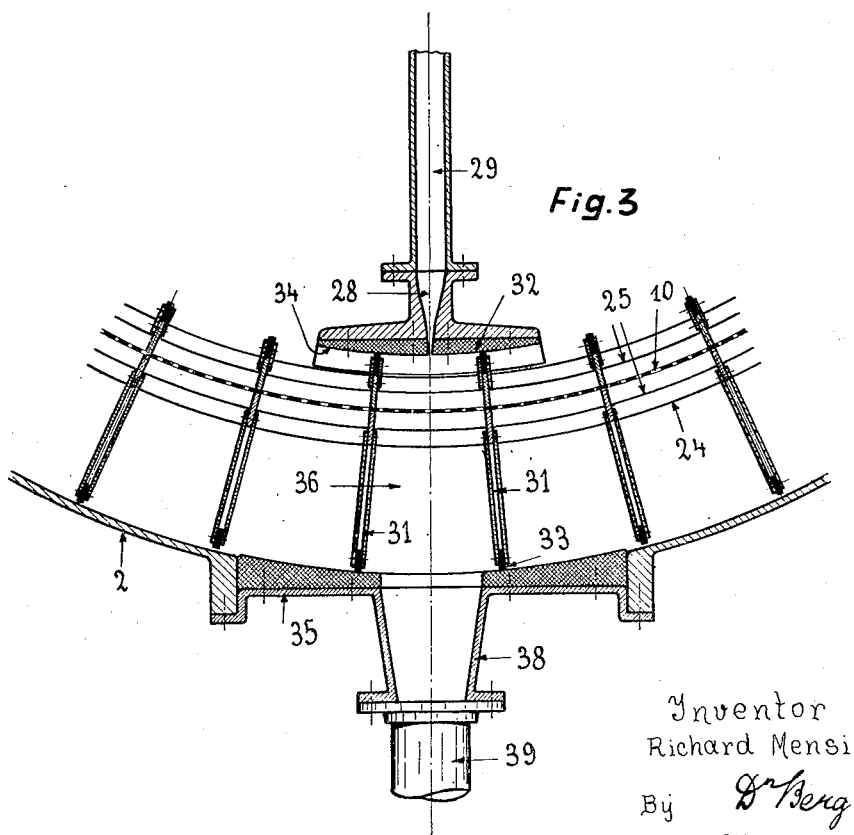
Figure 3 is an enlarged sectional view of the apparatus at the point where the cleansing stream is isolated from the stream or current of water or the like under treatment.

To this end the sieve 12 is provided at suitable distances apart with rings 24 and 25, the alternate rings 25 being preferably deeper than the rings 24 and acting to separate the drum into a number of rings side by side to each of which rings or annular sections a cleansing nozzle 29 opens. The operation of these nozzles for directing a cleansing jet on the sieve is best seen from Figure 3. Water for cleansing and under a suitable high pressure enters the pipe 30 and passes along the central hollow shaft or tube 12 to the radial pipes 29 which terminate in the spraying nozzles 28. The spraying nozzles 28 are extended to form flanges at their narrow ends and these flanges carry a suitable packing material such as leather or the like 34. Radiating plates 31 extending lengthwise of the sieve drum and from end to end thereof are clamped to the rings 24, 25 and the sieve 12 by screws or in any other suitable manner. These radiating plates carry packing material 32, 33 at their inner and outer ends which packings co-operate with the packing 34 on the nozzle flanges and 35 on the discharge pipe 38. As will be seen from Figure 3, the chamber 36 between two adjacent radiating plates 31 is isolated from the stream of liquid under treatment during the time the sieve is slowly moving past the jets 28. This happens to all the compartments in turn and the sieve is well and thoroughly cleansed at each revolution. The sludge and waste cleansing water are removed by the pipe 39. The arrows 23 and 27 indicate the direction of the stream of liquid under treatment and from these it will be seen that the form of apparatus shown in Figures 1 and 2 is of the outer feed type.

Figure 4:
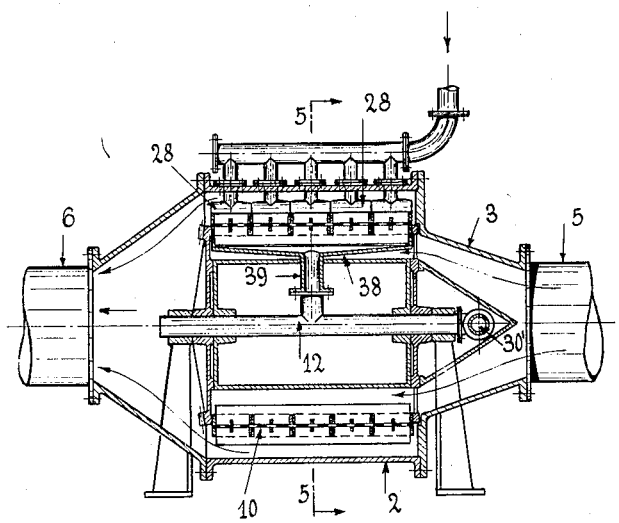
Figures 4 and 5 are longitudinal and cross sections respectively of an apparatus of the "inner feed type".
Figure 5:
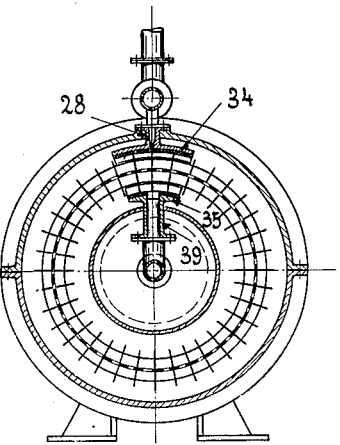

In the form according to Figures 4 and 5, the invention is illustrated as applied to an apparatus of the inner feed type. In this case the coned end of the casing at the inlet or supply end is smaller and the openings or ports leading to the inner surface of the sieve are radially within the sieve instead of being placed at 22 as in Figure 1. The solid end wall 11 is provided as in the former case and the spider structure is preferably replaced by a drum structure the diameter of which corresponds to the diameter of the base of the distributing cone 26. In this case also instead of the cleansing water stream entering at the centre and the waste and sludge being discharged at the circumference of the sieve, the reverse direction of operation is employed. The nozzles 28 are arranged in a battery on the top of the casing 2 and the sludge discharge and the removal pipe 39 conduct the waste water and sludge to the central hollow shaft 12 and the outlet pipe 30'. The construction otherwise is similar to that described above with reference to Figures 1–3 and the operation will be readily followed, it being observed that the directions are all reversed.

Figure 6:
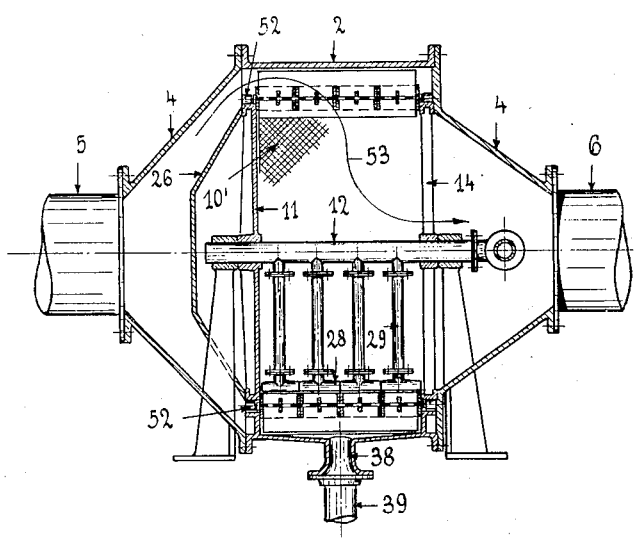
Figures 6 and 7 are longitudinal and cross sections respectively of an apparatus employing a travelling sieve drum which, in the form illustrated, is of substantially oval cross section. The plant is of the "outer feed type".
Figure 7:
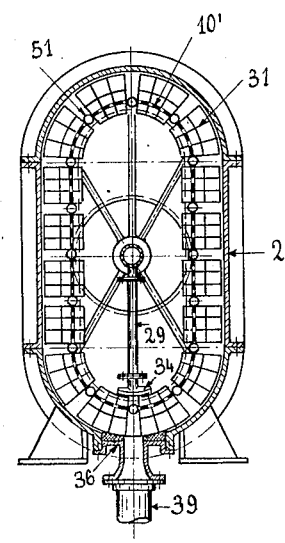

In the form of the invention shown in Figures 6 and 7 a substantially oval shape of sieve drum is employed. The sieve is driven in any suitable and known manner not shown. The parts of the sieve are hinged together at 52 and three compartments with four radiating plates are arranged between adjacent hinges 52. The apparatus is of the outer feed type and the water under treatment passes in the direction of the arrow 53. In this case also, as in all those already described, the entire surface area of the sieve, with the exception of the section or chamber for the time being opposite the cleansing jet is active and effective to cleanse or filter the water under treatment. The efficiency of the apparatus is thus a maximum and the space occupied is a minimum for any given through put of water.

I claim:

1. In combination in a water purifying apparatus, an enclosing casing, a rotatable sieve drum in said casing, an open and a closed end on said sieve drum, circumferentially spaced plates radiating from said sieve and movable therewith, a central hollow shaft on which said sieve drum ends are rotatably mounted, means for driving said sieve drum, spraying nozzles directing cleansing streams radially through said sieve at one point in the travel thereof, packing means on said nozzles and on the casing opposite said nozzles and packing members on the circumferentially spaced plates co-operating with said packing members on the nozzles and casing and means connecting said nozzle stream to the hollow shaft.

2. In a water purifying apparatus having a movable sieve completely immersed in the liquid, means for cleansing the sieve during the operation of the apparatus, said means employing a cleansing stream injected through said sieve in a reverse direction to that of the liquid under treatment and means for isolating said cleansing stream from the stream of liquid under treatment, said isolating means comprising plates spaced circumferentially around the sieve to move therewith and divide the said sieve into a plurality of sections, packing means on said injecting means and on the casing and packing members on the circumferentially spaced plates co-operating with said packing means.

3. In a water purifying plant having a rotatable sieve working totally immersed in the liquid, rings spaced axially along said sieve to divide same into a number of sieve rings arranged side by side, plates mounted on said rings to lie in radial planes and spaced circumferentially around said sieve, injection nozzles located to operate radially at one point in the travel of the sieve and between pairs of axially spaced rings, packing surfaces on the nozzles and on the casing opposite said nozzles and packing members on the radially arranged plates to co-operate with said packing surfaces.

4. In a water purifying apparatus, a totally immersed sieve divided axially into a number of ring sections arranged side by side, plates arranged in said ring sections in radial planes and sub-dividing said ring sections circumferentially, an injection nozzle directing a radial stream into each section and between passing pairs of radially arranged plates, means for rotating said sieve together with the rings and radially arranged plates, packing means co-operating with said radially arranged plates as they pass the injection nozzle to isolate the nozzle stream, a pressure supply to the nozzle and a discharge arranged on the opposite side of said radially arranged plates to that at which the nozzle operates, substantially as described.

5. In combination, an axially horizontal rotary drum having side walls of radially arranged longitudinal plates forming passages therebetween and having outer packing material at the outer edges, and sieve material across said passages; a liquid-tight casing completely enclosing and spaced from the drum; a high pressure pipe passing in an air-tight manner through a wall of the casing; downwardly directed cleaning nozzles connected to said pipe, each provided at the lower end with a narrow jet opening and a wide flange adjacent to said side wall; and a discharge pipe in the wall of the casing opposite to said nozzles and provided with packings engaging said outer packing material.

6. In combination, an axially horizontal rotary drum having a closed end, a partially open end and side walls of sieve material; a casing completely enclosing and spaced from the drum and having inlet and outlet pipes at opposite ends; flow preventing means between the side wall of the casing and the periphery of the open end of the drum; a fixed hollow shaft on which said drum rotates, said shaft being closed at one end; a high pressure pipe connected to the other end of the hollow shaft and passing in an air-tight manner through a wall of the casing; downwardly directed cleaning nozzles extending from said fixed shaft and each provided at the lower end with a narrow jet opening and a wide flange adjacent to said side wall, to isolate streams from said nozzles; and a discharge pipe in the wall of the casing opposite to said nozzles and provided with a wide mouth adjacent to the side wall; the discharge pipe inlet being lower than said nozzles and passages to facilitate carrying away the sludge.

7. In combination, an axially horizontal rotary drum having a closed end, an open end and side walls comprising end and intermediate ring sections arranged side-by-side and radially arranged longitudinal plates crossing said intermediate sections and having outer and inner packing material at the outer and inner edges to form passages, and sieve material across said passages; a casing completely enclosing and spaced from the drum and having inlet and outlet pipes at opposite ends; packing means between the side wall of the casing and the periphery of the open end of the drum; a fixed hollow shaft on which said drum rotates, said shaft being closed at one end; a high pressure pipe connected to the other end of the hollow shaft and passing in an air-tight manner through a wall of the casing; downwardly directed cleaning nozzles extending from said shaft and each provided at the lower end with a narrow jet opening and a wide packing covered flange engageable by said inner packing material to close the inner part of said passages, one at a time; and a discharge pipe in the wall of the casing opposite to said nozzles and provided with packings engaging said outer packing material; the discharge pipe inlet being lower than said nozzles and passages to facilitate carrying away the sludge.

RICHARD MENSING.